US010747784B2

(12) United States Patent
Odibat et al.

(10) Patent No.: US 10,747,784 B2
(45) Date of Patent: Aug. 18, 2020

(54) IDENTIFYING REASON CODES FROM GRADIENT BOOSTING MACHINES (71) Applicant: VISA INTERNATIONAL SERVICE ASSOCIATION, San Francisco, CA (US)

(72) Inventors: Omar Odibat, Cedar Park, TX (US); Claudia Barcenas, Austin, TX (US)

(73) Assignee: Visa International Service Association, San Francisco, CA (US)

(*) Notice: Subject to any disclaimer, the term of this patent is extended or adjusted under 35 U.S.C. 154(b) by 636 days.

(21) Appl. No.: 15/482,489

(22) Filed: Apr. 7, 2017

(65) Prior Publication Data
US 2018/0293292 A1    Oct. 11, 2018

(51) Int. Cl.
  *G06F 16/28*    (2019.01)
  *G06N 20/00*    (2019.01)
  (Continued)

(52) U.S. Cl.
  CPC ............ *G06F 16/285* (2019.01); *G06F 15/76* (2013.01); *G06F 16/24578* (2019.01);
  (Continued)

(58) Field of Classification Search
  CPC .... G06F 16/285; G06F 16/9535; G06F 15/76; G06N 20/20; G06N 20/00; G06N 5/003
  See application file for complete search history.

(56) References Cited

U.S. PATENT DOCUMENTS 6,269,353 B1    7/2001  Sethi et al.
7,930,353 B2 *  4/2011  Chickering ............ H04L 51/12
                                                709/206
(Continued)

FOREIGN PATENT DOCUMENTS

WO    2016070096    5/2016
WO    2016178789    11/2016

OTHER PUBLICATIONS

PCT/US2018/024896, "International Search Report and Written Opinion", dated Jul. 16, 2018, 11 pages.
(Continued)

*Primary Examiner* — Daniel C Puentes
(74) *Attorney, Agent, or Firm* — Kilpatrick Townsend & Stockton LLP (57)    ABSTRACT

A classification server perform a method for classifying an entity and identifying reason codes for the classification. The classification server can use a gradient boosting machine to build a classification model using training data. The classification model can be an ensemble of decision trees where each terminal node in the decision tree is associated with a response. The responses from each decision tree can be aggregated by the classification server in order to determine a classification for a new entity. The classification server can determine feature contribution values based on expected feature values. These feature contribution values can be associated with each of the responses in the classification model. These feature contribution values can be used to determine reason codes for the classification of the entity. As such, the classification server can perform a single traversal of the classification model to classify the entity and identify reason codes.

20 Claims, 5 Drawing Sheets (51) Int. Cl.
    *G06F 16/9535*     (2019.01)
    *G06F 16/2457*     (2019.01)
    *G06F 15/76*     (2006.01)
    *G06N 20/20*     (2019.01)
    *G06N 5/00*     (2006.01)

(52) U.S. Cl.
    CPC ......... *G06F 16/9535* (2019.01); *G06N 5/003* (2013.01); *G06N 20/00* (2019.01); *G06N 20/20* (2019.01)

(56) References Cited

U.S. PATENT DOCUMENTS

| | | |
|---|---|---|
| 2013/0132311 A1 | 5/2013 | Liu et al. |
| 2014/0279815 A1 | 9/2014 | Wang et al. |
| 2015/0019211 A1 | 1/2015 | Simard et al. |
| 2015/0036942 A1 | 2/2015 | Smirnov et al. |
| 2015/0379426 A1 | 12/2015 | Steele et al. |
| 2016/0342963 A1 | 11/2016 | Zoldi et al. |

OTHER PUBLICATIONS

Xu et al., "Gradient Boosted Feature Selection", In: Proceedings of the 20th ACM SIGKDD International Conference on Knowledge Discovery and Data mining, Retrieved from <http://alicezheng.org/papers>, Sep. 30, 2014, pp. 1-2.

EP18781480.1, "Extended European Search Report", dated Apr. 29, 2020, 8 pages.

* cited by examiner

IDENTIFYING REASON CODES FROM GRADIENT BOOSTING MACHINES

BACKGROUND

Gradient boosting machines can be used to build models for classification of entities using a set of previously classified entities. To classify a new entity, the values of the entity's features can be determined and those feature values can be used to traverse the classification model. In contrast to certain other techniques for building classification models, gradient boosting machines can build a classification model that is an ensemble of smaller models, such as decision trees. Each of the smaller models can output a response score that depends on one or more different features of the new entity. While each of the smaller models may not be accurate in classifying new entities by itself, the classification model can provide accuracy by aggregating and weighting hundreds or thousands of smaller models.

While gradient boosting machines can build accurate classification models, it can be difficult or impractical to identify which features had the greatest effect on the classification outcome. One cause of the difficulty in determining the classification reasons is the composition of the classification model, which can include hundreds or thousands of smaller models, where each of the smaller models can depend on more than one feature, and more than one of the smaller models can depend on the same feature. Accordingly, there is a need for improved processes for determining reason codes from gradient boosting machines.

SUMMARY

A classification server perform a method for classifying an entity and identifying reason codes for the classification. The classification server can use a gradient boosting machine to build a classification model using training data. The classification model can be an ensemble of decision trees where each terminal node in the decision tree is associated with a response. The responses from each decision tree can be aggregated by the classification server in order to determine a classification for a new entity. In addition, the classification server can determine feature contribution values based on expected feature values. These feature contribution values can be associated with each of the responses in the classification model. These feature contribution values can be used to determine reason codes for the classification of the entity. As such, the classification server can perform a single traversal of the classification model to both classify the entity and to identify reason codes.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

A "computer" or "computer server" may refer to a single computer or a cluster of computers communicating in a system. For example, the computer can be a large mainframe, a minicomputer cluster, or a group of servers functioning as a unit. In one example, the computer may be a database server. The computer may include any hardware, software, other logic, or combination of the preceding for processes the requests from a user interface or from one or more client computers. The computer may comprise one or more computational apparatuses and may use any of a variety of computing structures, arrangements, and compilations for servicing the requests from one or more client computers.

"Machine learning" generally refers to a variety of different computer-implemented processes that build models based on a population of input data by determining features of the entities within the population and the relationships between the entities. To build the model, the machine learning process can measure a variety of features of each entity within the population and the features of different entities can be compared to determine segmentations. For example, a machine learning process can be used to cluster entities together according to their features and the relationships between the entities. "Supervised machine learning" generally refers to machine learning processes that receive training data having predetermined solutions (e.g., the data is labeled or classified). A supervised machine learning process can use a set of population data and associated labels for each object in the training data and generate a set of logic to determine labels unlabeled data. For example, a supervised machine learning process can build a character recognition model using images of letters and numbers that are labeled according.

The term "classifier" generally refers to a description of an entity. The classifier may be determined by a human. For example, a person may report that a particular transaction is "fraudulent" or "not-fraudulent." In another example, images may be labeled with the following labels based on what objects are shown in the image: "building," "people," "car," "truck," "dog," etc. One or more labeled may be applied to each entity. Entities having the same label may have one or more features having similar values.

The term "features" generally refers to the set of measurements for different characteristics or attributes of an entity as determined by a machine learning process. As such, the features of an entity are characteristic of that entity, such that similar entities will have similar features depending on the accuracy of the machine learning process. For example, the "features" of a transaction can include the time of the transaction, the parties involved in the transaction, the amount of the transaction. In addition, the features of a transaction can be more complex, including a feature indicating the patterns of transactions conducted by a first party, or patterns of the other people involved in transaction with the first party. In another example, "features" of an image can be determined based on color and luminance across its pixels and the distribution of different colors across the image. The features determine by complex machine learning algorithms may not be understandable by humans. That is, the individual feature values may represent a certain characteristic, but this is a result of a complex algorithm and not a simple measurement that can be easily performed by a human. The features can be stored as an array of integer values. For example, the features for two different entities may be represented by the follow arrays: [0.2, 0.3, 0.1, . . . ] for the first entity and [0.3, 0.4, 0.1, . . . ] for the second entity.

The term "reason code" refers to an code, phrase, or narrative that identifies which features of an entity were the cause of the classification of that entity. For example, a classification system may assign a "fraudulent" classifier to a particular transaction and the reason code for that classification may identify the "transaction amount" and "address verification" features as being the reason for that classification. The reason code may also include more detailed information, such as the conditions for each respective feature that caused the classification. For example, the reason code may indicate that the transaction was classified as "fraudulent" due to the transaction amount being larger than a specified threshold and the address not being verified.

DETAILED DESCRIPTION

Gradient boosting machines can be used to build models for classification of entities using a training set of previously classified entities. Classification models build by gradient boosting machines can be an ensemble of hundreds or thousands of smaller sub-models, such as decision trees. The classification models is complex since each of the smaller sub-models in the ensemble can depend on one or more different entity features and more than one of the smaller models can depend on the same feature. Because of this, it can be difficult or impractical to identify which features of a newly classified entity had the greatest effect on the classification outcome.

While classification models built by gradient boosting machines are more accurate than simpler classification models, their increased complexity makes it impractical to determine reason codes that identify which features were the cause of the classification. One solution is to build a separate simpler model, that is not based on a gradient boosting machine, in order to generate reason codes. When new entity data is received, it can be run through both models, the complex classification model (built using a gradient boosting machine) and the simpler reason code model. However, this solution can be inaccurate as a result of differences between the two separate models. Another solution is to iteratively adjust the features of the input entity data and re-run the classification model in order to determine how the adjustments changed the response. However, this solution requires a large amount of computer resources and time in order to process the classification model several times.

An improved solution, described in further detail below, can accurately identify reason codes for the classification while only processing the classification model once by combining both classification and reason code determination in a single model. To create the combined model, the contribution of each feature is determined for each response of each sub-model within the combined model. These feature contributions can be ranked and used to identify one or more reason codes. As such, the combined model solution provides accurate reason codes, since the feature contributions are tied to the classification model, while providing real time classification, since the model only needs to be run once.

The combined model can be built in two steps during an "offline" phase (e.g., before the model is in operational use for entity classification). In the first step, a gradient boosting machine learning process can build a classification model using a set of training data. In the second step, estimated feature contributions for each response of the classification model are determined based on the average features of the entities within the set of training data. Since the feature contributions are estimated using the averaged features, this process only needs to be performed once and it can be performed offline. That is, the feature contributions do not need to be re-determined for each new entity that is classified by the model. As such, when the classification model is used in an "online" phase (e.g., when the mode is in operational use for entity classification) it can identify both classifiers and reason codes in a single traversal of the model.

By estimating the feature contributions before the combined model is in operational use, some of the complex and computing-resource intensive calculations can be performed in the offline phase instead of the online phase. Furthermore, the feature contribution determination process only needs to be performed once for a particular classification model. As such, the amount of time and computing resources used to classify an entity and identify the corresponding reason codes is reduced using the combined model compared to other solutions. The improved combined model is described in further detail below with reference to FIGS. 1-5.

I. Classification System Diagram

Figure 1:
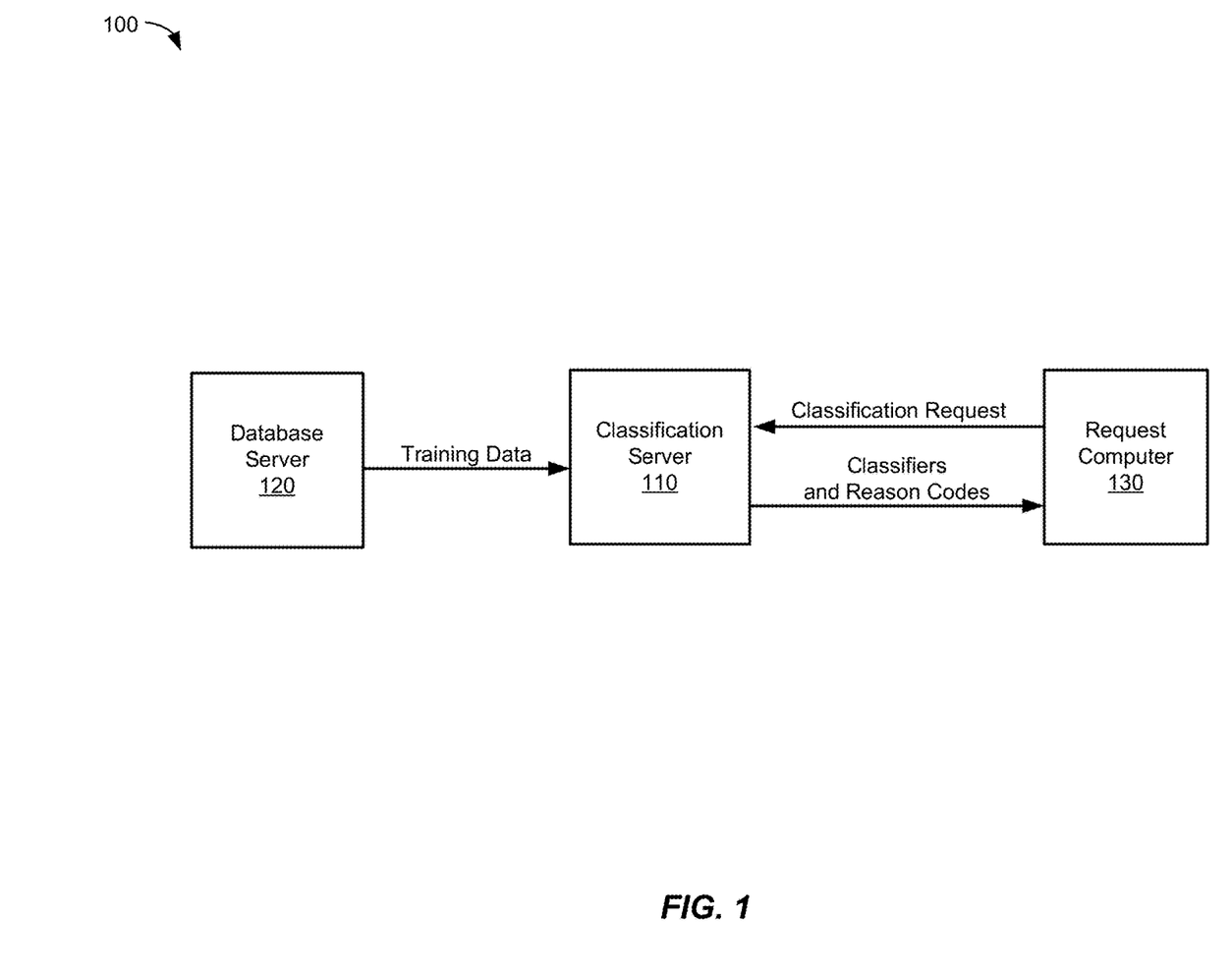
FIG. 1 is a block diagram of a classification system for classifying entities, according to some embodiments.

FIG. 1 is a block diagram of a classification system 100 for classifying entities, according to some embodiments. The classification system 100 includes a classification server 110 that can classify an entity using a classification model. The classification server 110 can classify an entity by traversing the classification model using entity data for that entity. The classification server 110 can build the classification model in an offline phase using a set of training data including entity data for a plurality of entities and classification data indicating one or more classifiers that are associated with each of the plurality of entities. The training data can be received from a database server 120 or it can be stored by the classification server 110. The classification model built by the classification server 110 can be a combined model that can be used to determine both classifiers and reason codes.

After building the classification model offline, the classification server 110 can use the model to determine a classification score for a new entity that is not included in the training data during an online phase. For instance, the classification server 110 may classify a new entity upon request from a request computer 130. The request computer 130 can send a classification request message including entity data to the classification server 110. The classification server 110 can receive the entity data from the request computer 130. The entity data received from the request computer 130 may indicate values for each of the features of the entity or the classification server 110 may determine feature values for the entity based on the entity data. The classification server 110 can traverse the classification model using the feature values to determine one or more classifiers of the entity. The classifiers can be numerical scores that indicate certain classifications or they can be labels of classifications.

The classification server 110 can also determine feature contribution values for each of the entity's features. The classification server 110 can rank the feature contribution values and then identify one or more reason codes corresponding to each of the one or more classifiers. The reason codes can indicate which features were the greatest cause for the entity being classified by a particular classifier. The classification server 110 can send the classifiers and reason codes to the request computer 130 in a classification response message.

The request computer 130 may perform different operations based on the classification of the entity. For example, the request computer 130 may deny access to a resource if a transaction entity is classified as fraudulent. In another example, the request computer 130 can use the classified image entities for object and character recognition.

II. Classification Model Generation and Operation

Figure 2:
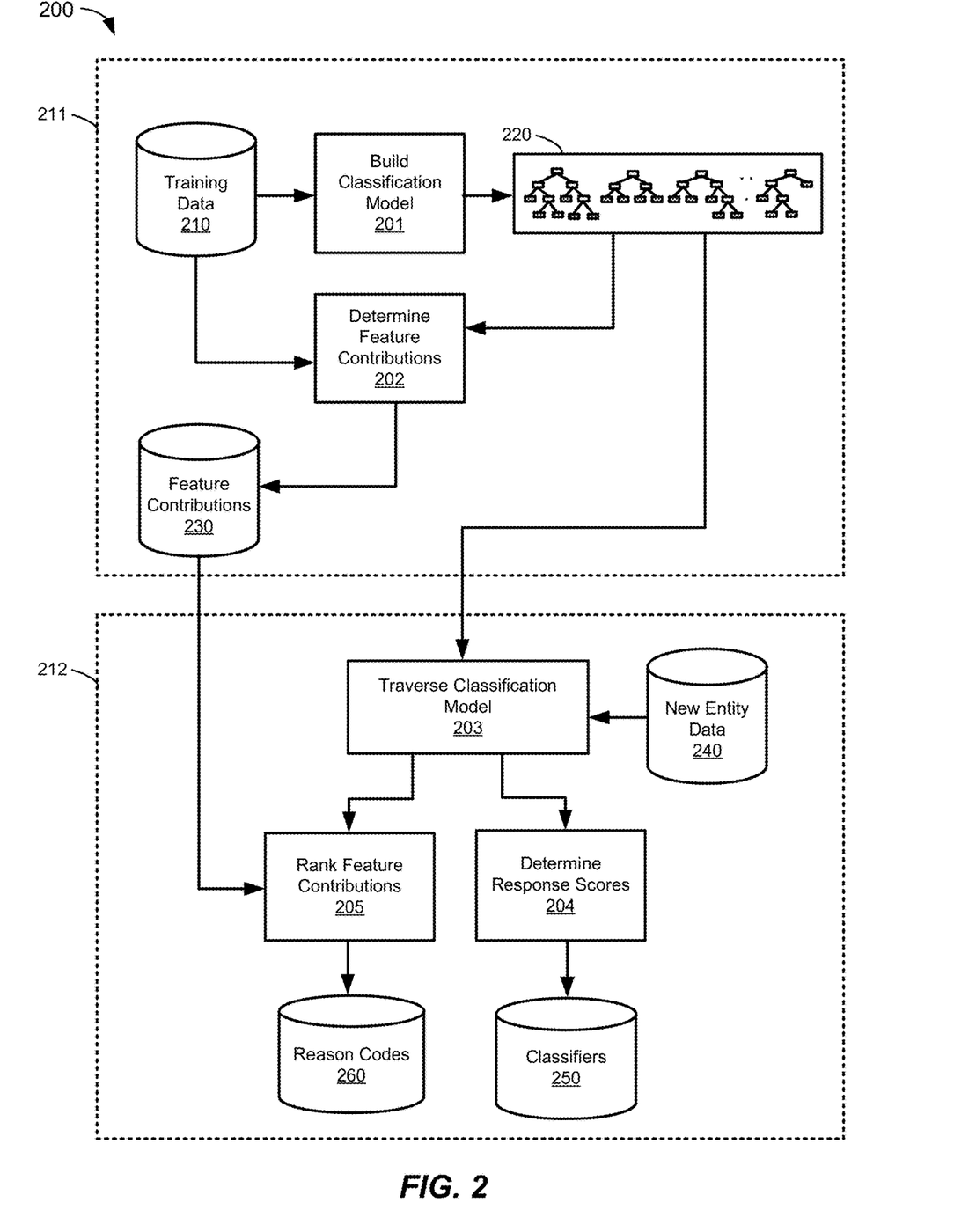
FIG. 2 is a process flow diagram for building a classification model and classifying an entity, according to some embodiments.

A classification server can use a classification model to determine classifiers of an entity and reason codes for the classification using a classification model. FIG. 2 is a process flow diagram 200 for building a classification model and classifying an entity, according to some embodiments. During an offline phase 211, a classification server can build a classification model 220 and determine feature contributions 230. After the offline phase 211, the classification server can operate in an online phase 212 in which it can classify a new entity. The processes shown in FIG. 2 may be performed by a classification server, such as the classification server 110 of FIG. 1.

During the offline phase 211, the classification server can obtain training data 210. For example, the classification server can receive the training data 210 from a database server. The training data 210 can include entity data for a plurality of entities. The entities included in the training data 210 may be a representative sample selected from a population of entities. The entity data in the training data 210 can include information describing the features or characteristics of each entity. Each entity may have one or more features and the training data 210 can include feature values for each feature of the entity.

In some situations, the classification server may need to perform a feature extraction process in order to determine the feature values from the entity data. The feature extraction process may be a machine learning algorithm that determines the determines feature values for an entity such that similar entities have similar feature values. In one example, the features of a transaction entity may be determined based on the relationships between the parties involved in the transaction or a comparison of the time and location of different transactions conducted by the same party. In another example, the features of an image entity can be determined based on color and luminance across its pixels and the distribution of different colors across the image.

The training data 210 can also include classification information associating one or more classifiers with each entity. For instance, the entities in the training data 210 may have been previously classified using one or more classification labels or classification scores. For example, if the entities in the training data 210 are transactions, then the classification information may associate each entity with a classification label or score indicating whether the transaction is "fraudulent" or "non-fraudulent." In another example, if the entities in the training data 210 are images, then the classification information may associate each entity with one or more classification labels or scores indicating the objects that are depicted in the image, such as "building," "person," "vehicles," "alphanumeric characters," etc. As such, the classification information can associate one or more classifiers with each of the plurality of entities that is included in the training data 210.

At 201, the classification server can build a classification model 220 based on the training data 210, which includes feature values for each entity, and the classification information, which associates each entity with one or more classifiers. The classification server can build the classification model 220 using a gradient boosting machine, which is a machine learning processes that can be used to build classification models including an ensemble of sub-models. For example, each of the sub-models can be decision trees. In the classification model 220, each of the smaller sub-models can output a response score that depends on one or more different features of entity. Responses from each of the sub-models can be weighted and combined together in order to accurately classify an entity. The classification model 220 is described in further detail below with respect to FIG. 3 and FIG. 4.

At 202, after the classification model 220 has been built, the classification server can determine feature contribution values 230 for each feature of the classification model 220. The feature contribution values 230 indicate how great of an effect the value of each feature had on the outcome of the classification. These feature contribution values 230 can be ranked in order to determine which features contributed the most to classification and reason codes can be identified based on the ranking.

The classification server can determine the feature contribution values 230 during the offline phase 211 by determine the expected feature values for each feature by averaging feature values across each of the entities in the training data 210. These average feature values may be used to determine the feature contribution values 230 associated with each response of the classification model 220. By determining the expected feature value, the feature contribution values 230 can be pre-determined in the offline phase 211, thereby enabling the classification server to identify reason codes based on the feature contribution values 230 in real-time during the online phase 221 using only a single traversal of the classification model 220. The determination of feature contribution values is described in further detail below with respect to FIG. 4

After the classification model 220 has been built and the feature contribution values have been determined, the classification server can operate in an online phase 212 in which the classification server classifies new entities (not in the training data 210) and identifies one or more reason codes for each classifier of the new entity. For example, the classification server can receive new entity data 240 for a new entity from a request computer (e.g., the request computer 130 of FIG. 1).

At 203, the classification server can traverse each sub-model of the classification model 220 using the feature values of the new entity data 240. In some situations, the classification server may determine the feature values for the new entity using a feature extraction process. In other situations, the feature values may have been previously determined and be included in the new entity data 240.

The traversal of the classification model results in a response value and one or more associated feature contribution values for each of the sub-models. The response values can be aggregated in order to determine one or more classifiers 250 for the new entity. The classification process is described in further detail below with respect to FIG. 3. The feature contribution values associated with each of the response values can be aggregated and ranked in order to identify reason codes 260 for the classification. The reason code identification process is described in further detail below with respect to FIG. 4.

The classification model 220 is advantageous because it combines the classification with the feature contributions such that reason codes can be identified at the time of classification, with traversing a different response code model or the same classification model multiple times. As discussed above, the expected feature contribution values 230 are determined during the offline phase 211 such that they do not need to be re-calculated for each new entity being classified during the online phase 212. Since the feature contribution values 230 are pre-determined, only a single model needs to be traversed for each new entity during the online phase 212. Accordingly, the amount of time and computing resources spent for both classification and reason code identification is reduced compared to other classification systems that traverse more than one model to determine both classifiers and reason codes.

III. Classification Model Response Scoring

Figure 3:
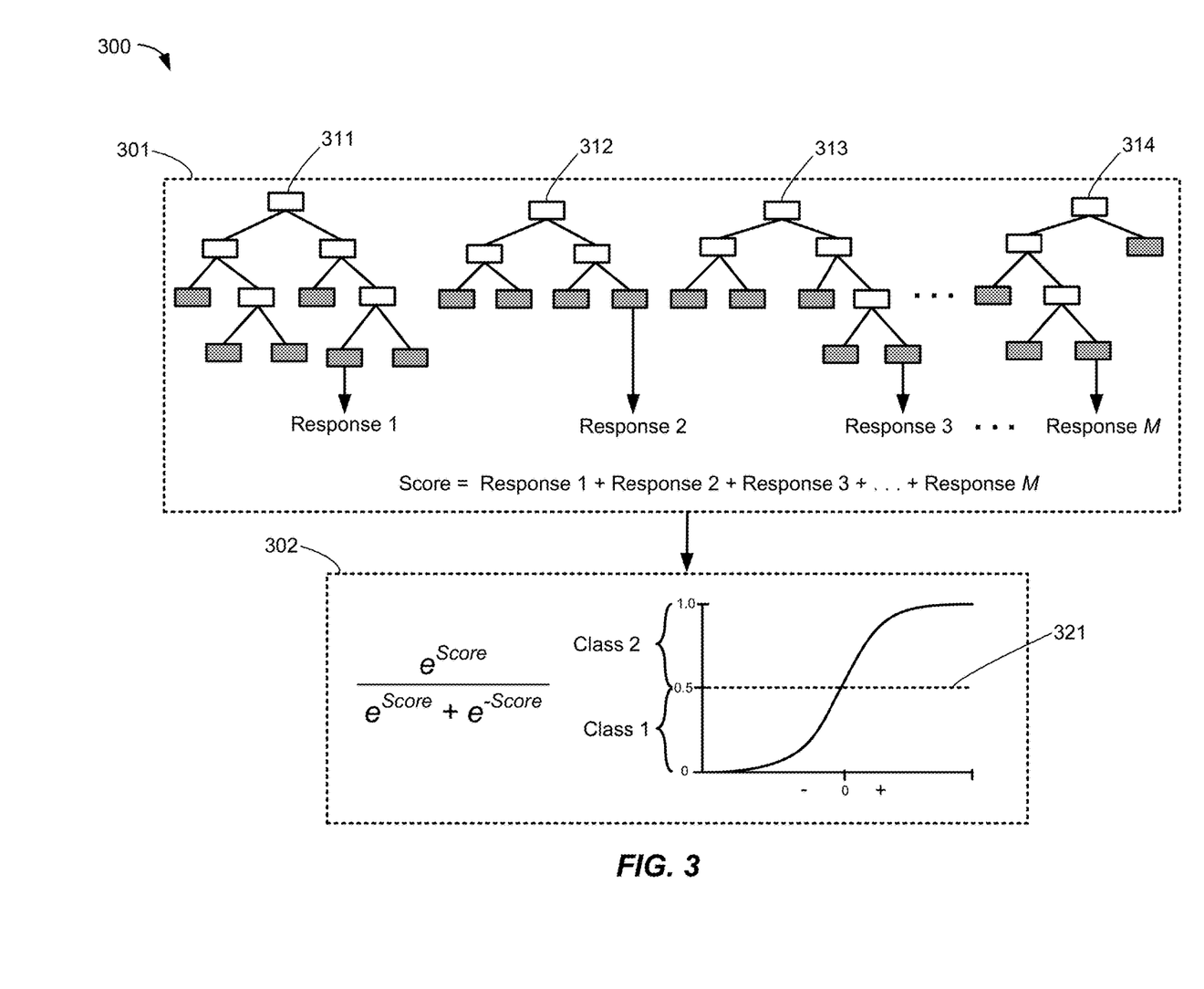
FIG. 3 is a diagram of a response scoring and classification process, in accordance with some embodiments.

As discussed above, a classification server can build a classification model that can be traversed in order to determine classifiers for an entity. FIG. 3 is a diagram 300 of a response scoring and classification process, in accordance with some embodiments. The response scoring process 301 determines a response score based on responses from each sub-model of the classification mode. The classification process 302 determines one or more classifiers based on the response score.

As discussed above, the classification model built and used by a classification server can be an ensemble of decision trees. As shown in FIG. 3, a classification model can include a first decision tree 311, a second decision tree 312, a third decision tree 313, a last decision tree 314, and a plurality of other decision trees (indicated by the ellipsis) that are not shown in FIG. 3 for simplicity. Each decision tree of the plurality of decision trees in the classification model can contain a plurality of nodes, which are depicted as boxes in FIG. 3. The nodes can be associated with one or more features and a set of feature values for that particular feature. The set of feature values for the condition may be determined using a threshold value, such that the decision at each node can branch based on whether the condition is met ("YES") or not met ("NO"). The traversal of the nodes within a decision tree is discussed in further detail below with respect to FIG. 4.

Each decision tree of the plurality of decision trees in the classification model can contain a plurality of branch containing one or more conditional nodes and a terminal node, the branches being depicted as vertices connected nodes within the branch in FIG. 3. The terminal nodes being depicted as gray colored boxed in FIG. 3. As a result of building the decision trees using a gradient boosting machine, each of the terminal nodes is associated with a response value. These response scores are weighted based on the accuracy of the decision tree in classifying the entities in the training data.

When new entity data is received, the feature values for that entity are used to traverse the trees, going down a certain branch in the decision tree to a particular terminal node depending on whether the feature conditions of that branch are met. The response values for each tree can be aggregated into a score. In the example shown in FIG. 3, the first decision tree 311 outputs a value of "Response 1," the second decision tree 312 outputs a response value of "Response 2," the third decision tree 313 outputs a response value of "Response 3," the last decision tree 314 outputs a response value of "Response M," and each of the plurality of decision trees not shown in FIG. 3 also output a response value (indicated by the ellipsis). As such, a response value can be identified for each decision tree based on each terminal node hit during the traversal.

The classifier for an entity can be determined using a sigmoidal function based on the response score. For example, the classification function (1) below may be used to compute a classification score based on the response score.

$$e^{Score}/(e^{Score}+e^{-Score}) \qquad (1)$$

This classification function (1) can be graphed as shown in FIG. 3. According to the classification function (1), the classification score may be less than 0.5 when the response score is a negative value, 0.5 when the response score is 0, and greater than 0.5 when the response score is a positive value. The classifier for a particular entity can be determined using a threshold value 321 (e.g., 0.5). For example, if the classification function (1) results in a classification score that is less than 0.5, the entity can be associated with the classifier "Class 1." And if the classification function (1) results in a classification score greater than or equal to 0.5, then the entity can be associated with the classifier "Class 2." In some embodiments, more than one threshold value can be used to select between more than two classifiers.

IV. Reason Code Identification

Figure 4:
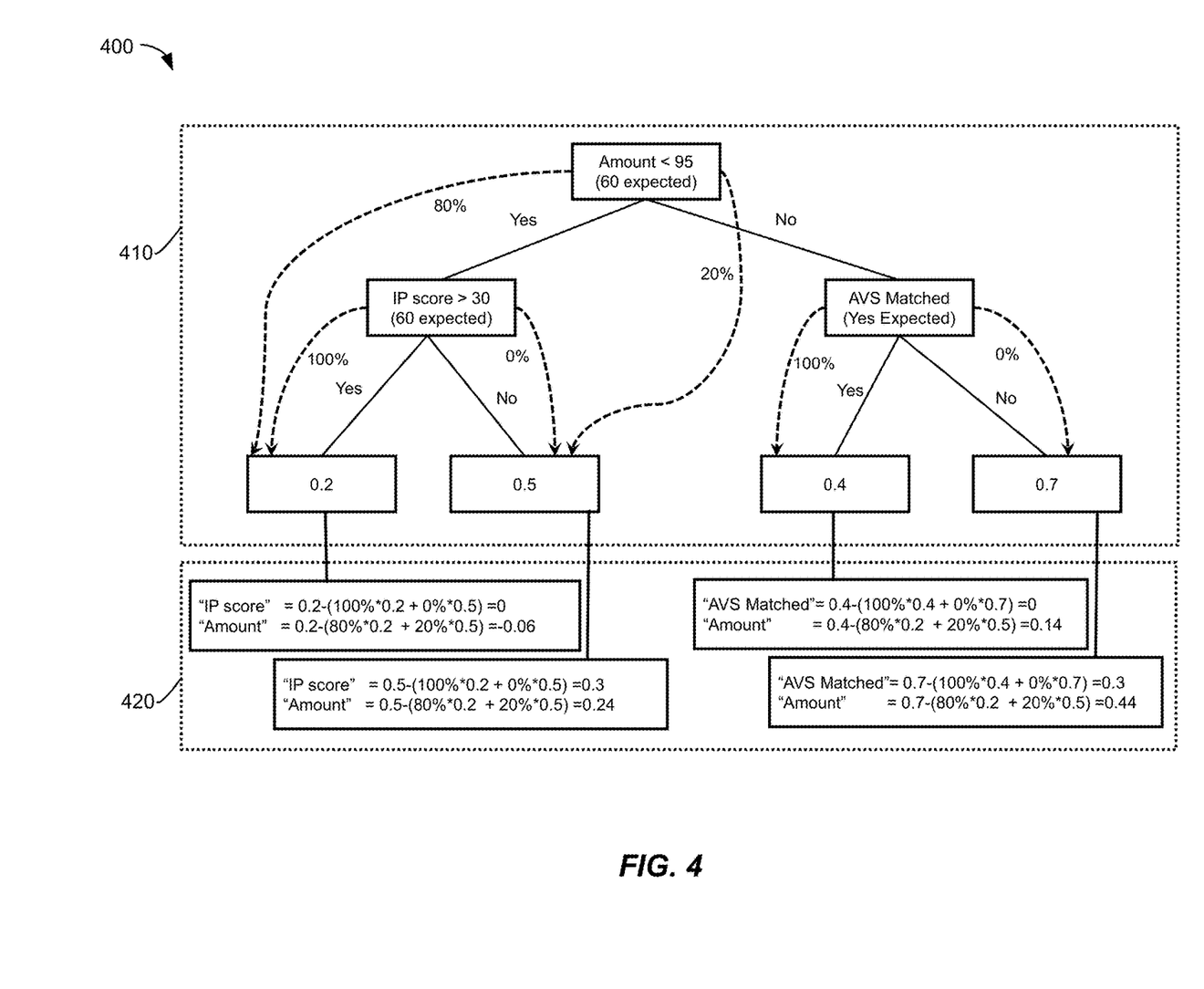
FIG. 4 is a diagram of a decision tree having terminal nodes associated with feature contribution values, in accordance with some embodiments.

The terminal nodes of the decision trees in a classification model can each be associated with a response value. In addition, each of the terminal nodes can be associated with one or more feature contribution values that can be used to identify reason codes. As such, the reason codes can be identified in real time, using a single model. FIG. 4 is a diagram 400 of a decision tree 410 having terminal nodes associated with feature contribution values 420, in accordance with some embodiments.

As discussed above, a gradient boosting machine process can built a classification model that is an ensemble of hundreds or thousands of decision trees. The decision tree 410 is an example of a single decision tree within the classification model. This decision tree may be traversed by the classification server, in addition to other decision trees of the classification model, when classifying a new entity during an online phase.

In this example, the decision tree 410 may have been built using training data for transaction entities that have been pre-classified as "fraudulent" or "non-fraudulent." The features of the transaction entities can include an Internet Protocol (IP) reputation score ("IP Score") that has been pre-determined by a third party. In this example, greater IP Score feature values (e.g., greater than 30) may indicate that the transaction is more likely to be classified as "non-fraudulent" and lower IP Score feature values (e.g., not greater than 30) may indicate that the transaction is more likely to be classified as "fraudulent."

The features of the transaction can also include an "Amount" feature value indicating the amount of the transaction. In this example, lower amount values (e.g., less than 95) may indicate that a transaction is more likely to be classified as "non-fraudulent" while greater amount values (e.g., not less than 95) may indicate that the transaction is more likely to be classified as "fraudulent."

The features of the transaction can also include "Address Verification Service Match" feature indicating whether the a verification server has matched the address used to conduct the transaction with a registered address. In this example, the Address Verification Service (AVS) match ("yes") may indicate that the transaction is more likely to be classified as "non-fraudulent" while the AVS not matching ("no") may indicate that the transaction is more likely to be classified as "fraudulent."

As shown in FIG. 4, each terminal node of the decision tree 410 is associated with a response score, indicated by the value within the terminal nodes. The response scores are based on the pre-determined classifications of entities having the features of the nodes within the branch of that terminal node. In this example, an entity having an IP Score feature value that is greater than 30 and an Amount feature value that is less than 95 will cause the decision tree 410 to output the response of 0.2 while an entity having an IP Score feature value that is not greater (less) than 30 and an Amount feature value that is less than 95 will cause the decision tree to output a response of 0.5.

In this example, an entity having an AVS Matched feature value of "Yes" and an Amount feature value that is not less (greater) than 95 will cause the decision tree to output the response value of 0.4 while an entity having an AVS Matched feature value of "No" and an Amount feature value that is not less (greater) than 95 will cause the decision tree to output the response value of 0.7.

The classification model may assign positive response values to terminal nodes that have a set of feature values that are more likely to be classified as "fraudulent" and negative values to terminal nodes that have a set of feature values that are more likely to be classified as "non-fraudulent" based on the number of entities classified as such in the training data.

The classification server can determine one or more feature contribution values 420 for each of the response values (e.g., for each terminal node). The classification server can determine feature contribution values for each of the features that a particular branch is based on. For example, the far-right branch having a response value of 0.7 is based on the Amount feature, and the AVS Matched feature. Accordingly, the classification server can determine feature values for the Amount feature and the AVS Matched feature.

As discussed above, the classification server can determine the feature contribution values based on an expected feature value. The feature contribution values 420 can also be based on the particular features position within the tree and the percentage of entities within the training data that meet the conditions of the particular branch.

In order to determine the expected feature values, the classification server can determine the average value of the feature across all of the entities in the training data. In this example, the classification server can determine that the average IP Score feature value is 60, the average Amount feature value is 60, and the majority of the entities have the AVS Matched feature value of "Yes." These expected feature values are shown in nodes of the decision tree 410.

The classification server can use the expected feature values to determine the feature contribution values 420 to be associated with each terminal node. The feature contribution values are also based on the percentage of entities that are expected to meet the conditions of that branch using the expected feature values. To determine the expected feature contribution value for a particular feature at a first terminal node, the classification server can identify the node in the decision tree that corresponds to that feature. Then, the classification server can select one of the branches of that node would be followed using the expected feature value for that feature. Then, the classification server can identify each terminal node that is within the selected branch. The classification server can then adjust the response values for each terminal node within the selected branch based on the percentage of entities within the training set that both meet the condition of the node in the decision tree that corresponds to the feature (e.g., the entities that would follow the branch of the node selected using the expected feature value) and that would hit that particular terminal node. For example, if 20% of entities that would follow the selected branch would end at a particular terminal node, then the response value for that terminal node can be multiplied by 20%. The adjusted response values for each of the terminal nodes within the selected branch can be summed, and the summation of the terminal nodes within the selected branch (as adjusted) can be subtracted from the response value of the first terminal node itself.

The difference between the response value of the first terminal node and the summation of the adjusted response values of the terminal nodes within the branch selected by the expected feature value is the expected feature contribution value for that particular feature. As such, the expected feature contribution value for a feature indicates the amount of deviation between the feature value of the first terminal node from the expected feature value, thereby indicating the amount that the value for that feature contributed to the response value.

For example, in order to determine the feature contribution value for the AVS Matched feature in the terminal node having a response value of 0.7, the classification server may determine the difference between the current response and the expected response. As noted above, the expected AVS Matched feature value is "Yes." However, the terminal node having a response of 0.7 is hit when the AVS Matched feature value is "No." Since the AVS Matched feature value is different than the expected value, then the AVS Matched feature is a cause of the response score being high (e.g., being 0.7). According, the feature contribution value for the AVS Matched feature for this terminal node will be greater than 0.

To compute the AVS Matched feature contribution value, the classification server can use the response value of the terminal node (e.g., 0.7), the expected feature value for AVS Matched (e.g., "Yes") and the percentage of entities in the training data that would hit that terminal node (e.g., meet the conditions of the branch) based on the expected feature value for AVS matched (e.g., 0%). Since the expected feature value for AVS Matched is "Yes," then an expected entity would not hit the terminal node having the response of 0.7. Thus, 0% of expected entities would hit the terminal node having the response of 0.7 and 100% of expected entities would hit the terminal node having the response of 0.4 where the AVS Matched feature value is 0.1. 100% of the expected entities hit the AVS Matched "Yes" terminal node (response value 0.1) since the expected AVS Matched feature value is "Yes" and the AVS Matched condition is the last condition within this branch.

The feature contribution value of AVS Matched for the terminal node having a 0.7 response value can be determined by multiplying each opposing response score by the percentage of entities expected to hit that response score and subtracting these two values from the response score for that terminal node. The classification server can use the expected (e.g., average) feature values (IP Score is 60, Amount is 60, and AVS Matched is "Yes") to determine the percentage of entities expected to hit a response score. To do so, the classification server can identify the percentage of entities within the training data have feature values that meet the feature conditions of the branch. The percentage of entities expected to hit the response score of 0.4 (AVS Matched is YES) is 100% and the percentage of entities expected to hit the response score of 0.7 (AVS Matched is NO) is 0% are shown by the dashed arrows in FIG. 4. For example, the AVS Matched feature contribution value for the terminal node having a 0.7 response value can be computed using formula (2) below.

$$\text{AVS Matched Feature Contribution} = 0.7 - (100\% * 0.4 + 0\% * 0.7) = 0.3 \qquad (2)$$

Accordingly, the feature contribution value of AVS Matched for the terminal node having a 0.4 (AVS Matches is YES) can be computed using formula (3) below.

$$\text{AVS Matched Feature Contribution} = 0.4 - (100\% * 0.4 + 0\% * 0.7) = 0.0 \qquad (3)$$

The feature contribution value for AVS Matched is 0.0 for the node having a response of 0.4 because the AVS Matched feature value is expected to be "Yes" and the percentage of entities hitting that that terminal node (response 0.4) is 100%. As such, the AVS being matched is expected. Therefore, the AVS Matched being YES does not contribute to the response score being 0.4 since the AVS is expected to match.

With respect to the Amount feature, the classification server may determine that 80% of entities that an IP Score that is greater than 30 have an Amount feature value is less than 95. Accordingly, 20% of entities that have an IP Score that is not greater (less) than 30 have an Amount feature value that is not less than 95. Accounting, the classification server can determine the Amount feature contribution values for each of the terminal nodes based on these percentages. For example, the classification server can determine the Amount feature contribution value for the terminal node having the response value of 0.7 using formula (4) below.

$$\text{Amount Feature Contribution} = 0.7 - (80\% * 0.2 + 20\% * 0.5) = 0.44 \qquad (4)$$

Accordingly, the Amount not being less than 95 contributes to the response score being 0.7. The Amount feature contribution is high because the Amount feature value is different than expected (it is expected to be 60).

In addition, the classification server can determine the Amount feature contribution value for the terminal node having the response value of 0.4 using formula (5) below.

$$\text{Amount Feature Contribution} = 0.4 - (80\% * 0.2 + 20\% * 0.5) = 0.14 \qquad (5)$$

The Amount feature contribution is a positive value, indicating that the amount feature value contributed to the response value being 0.4.

The feature contribution values for the two other terminal nodes can be computed similarly. For example, the IP Score feature contribution value for the terminal node having the response value of 0.2 can be determined using formula (6) below.

$$\text{IP Score Feature Contribution} = 0.2 - (100\% * 0.2 + 0\% * 0.5) = 0 \qquad (6)$$

The Amount feature contribution value for the terminal node having the response value of 0.2 can be determined using formula (7) below.

$$\text{Amount Feature Contribution} = 0.2 - (80\% * 0.2 + 20\% * 0.5) = -0.06 \qquad (7)$$

The Amount feature contribution value being negative for the response of 0.2 indicates that the Amount value negatively contributed to the response value, reducing the response value comparatively.

The IP Score feature contribution value for the terminal node having the response value of 0.5 can be determined using formula (8) below.

$$\text{IP Score Feature Contribution} = 0.5 - (100\% * 0.2 + 0\% * 0.5) = 0.3 \qquad (8)$$

The Amount feature contribution value for the terminal node having the response value of 0.5 can be determined using formula (9) below.

$$\text{Amount Feature Contribution} = 0.5 - (80\% * 0.2 + 20\% * 0.5) = 0.24 \qquad (9)$$

The Amount feature contribution value being negative for the response of 0.2 indicates that the Amount value negatively contributed to the response value, reducing the response value comparatively.

In order to determine reason codes for the classification of an entity, the classification server can identify the feature contribution values that associated with each of the terminal nodes hit during the traversal of the classification model using the feature values of a particular entity. The feature contribution values for each feature can be summed across all of the decision trees in the classification model and a certain number of the top ranking feature contributions values can be selected to use for reason codes. For example, looking only at the decision tree 410 in FIG. 4, if the terminal node having the response value of 0.4 is hit, then the top ranking reason code for the classification score being 0.4 (e.g., the response value), is that the "Amount is not less than 95." To determine reason codes in consideration of the entire classification model, which may have the Amount feature in multiple decision trees, the Amount feature contribution values for each of the terminal nodes that are hit in the classification model can be summed together before the feature contributions are ranked.

Accordingly, the classification server can determine the both the response of each decision tree within the classification server and the feature contribution values for each response which can be used to identify reason codes. As such, the classification model is a combined classification and reason code identification model. The combined classification and reason code identification model can determine classifiers and reason codes for the classification using only a single traversal of the tree since the feature contribution values are based on the expected feature values. This combined model provides accurate reason code while reducing computation time since the reason codes are determined from a single traversal of the model.

V. Exemplary Method

Figure 5:
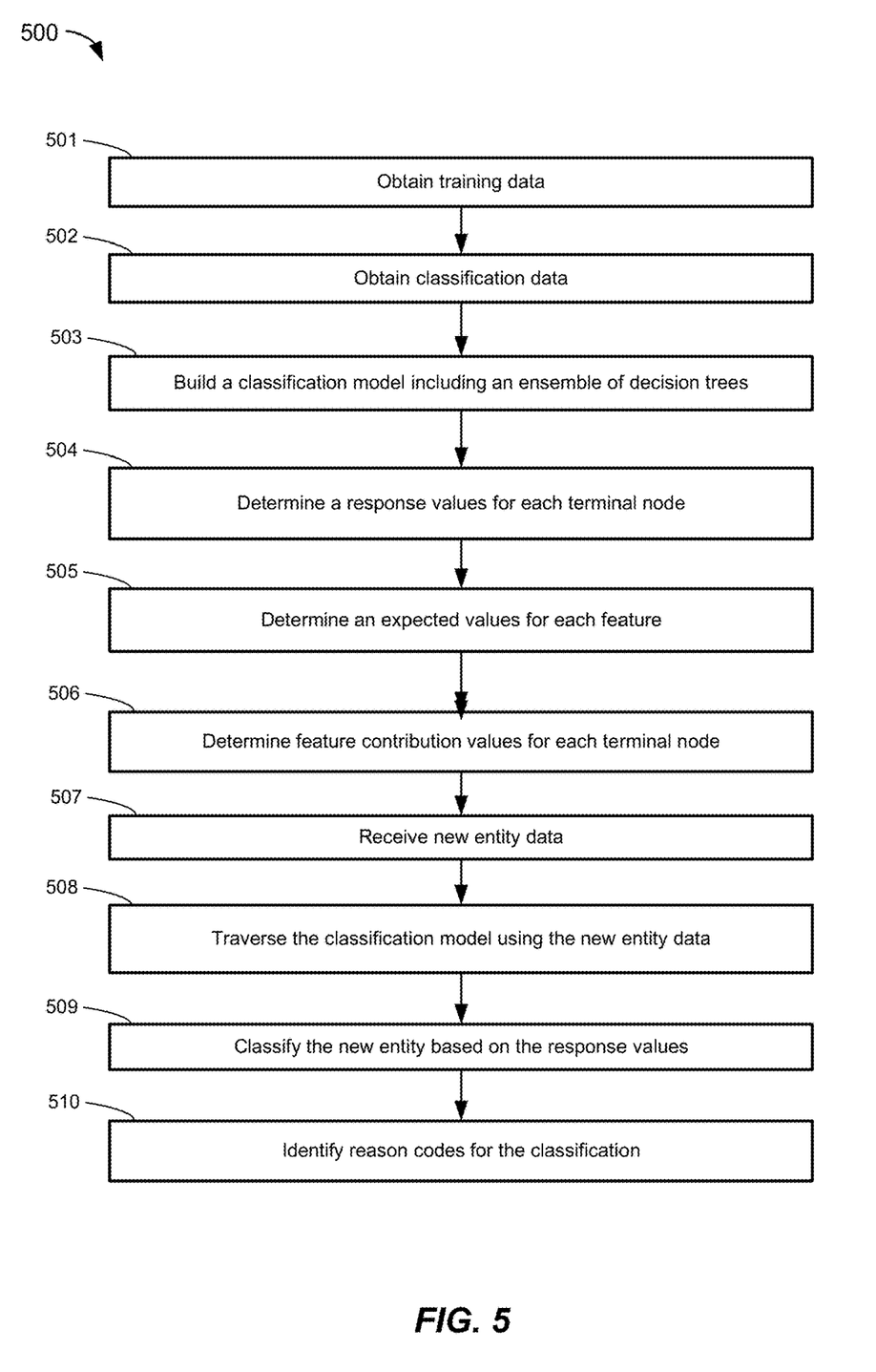
FIG. 5 is a flow chart 500 of a method for classifying and determining reason codes, in accordance with some embodiments.

FIG. 5 is a flow chart 500 of a method for classifying and determining reason codes, in accordance with some embodiments. This method can be performed by a classification server. At step 501 of the method, the classification server can obtain training data for a plurality of entities. As discussed above, each entity of the plurality of entities characterized by a plurality of features that characterize that entity and the entity data for a particular entity can indicate feature values for each feature of that entity. This step can be performed during on offline phase.

At step 502 of the method, the classification server can obtain classification data associated with each entity of the plurality of entities in the training data. The classification data may be included with the training data in some instances. The classification data can associate a plurality of different classifiers with the plurality of entities such that each entity of the plurality of entities is associated with one or more of the classifiers. This step can be performed during an offline phase.

At step 503 of the method, the classification server can build a classification model using the training data and the classification data. The classification model can be built using a gradient boosting machine. The classification model can include a plurality of decision trees for selecting the one or more classifiers. For example, the classification model can be an ensemble of more than a thousand decision trees. Each of the decision trees can contain a plurality of branches where each branch contains one or more conditional nodes and a terminal node. The conditional nodes can be associated with a particular feature (e.g., "Amount") and a set of feature values (e.g., "Amount <95") for that particular feature. Each of the terminal nodes can be associated with a response value. This step can be performed during an offline phase.

At step 504 of the method, the classification server can determine a response value for each terminal node of the decision trees in the classification model. The response values may be determined as part of the creation of the classification model using the gradient boosting machine process. This step can be performed during an offline phase.

At step 505 of the method, the classification server can determine expected feature values for each feature. The expected feature value for a particular feature based on the feature values of that feature for each entity of the plurality of entities. For example, the expected feature value for a particular feature can be the average value across all of the entities in the training data. This step can be performed during an offline phase.

At step 506 method, the classification server can determine feature contribution values for each terminal node in the decision trees of the classification model. The feature contribution values can be based on the expected feature value for that feature, the response value for that terminal node, and the positioning of the feature within the decision tree. For instance, the feature contribution value for a particular feature can be based on the difference between a first response value of a first terminal node included in a first branch having a first condition based on that particular feature and a second response value of a second terminal node included in a second branch having a second condition based on that particular feature. The determining expected feature values used in calculating the expected contribution values can be based on the feature values of that feature for each entity of the plurality of entities. For example, the average feature value across all of the entities can be used as the expected feature value for a particular feature. This step can be performed during an offline phase.

As shown in FIG. 4 and discussed above, the classification server can determine the feature contribution values based on the response values associated with a particular terminal node and the expected values for each feature associated with conditional nodes of the branch within which the particular terminal node is included. The feature-contribution values that are associated with that particular terminal node can include a contribution value for each feature that is associated with the conditional nodes of the branch within which the particular terminal node is included. For example, if the branch that a terminal node is in is based on the "IP Score" feature and the "Login Count" feature, then that terminal node can be associated with feature contribution scores for both the "IP Score" and the "Login Count." These feature-contribution values can indicate an amount that the particular feature contributed to the corresponding response value of that terminal node.

At step 507 of the method, the classification server can receive new entity data for a new entity. The new entity data may be received from a request computer. The new entity data may indicate feature values for each feature of the entity. In some cases, the classification server may determine the features of the entity using a feature extraction process. This step can be performed during an online phase.

At step 508 of the method, the classification server can traverse the classification model using the feature values for the new entity. In traversing the classification model, the classification server can select a plurality of terminal nodes based on whether the entities features meet the conditions of the branch that includes those terminal nodes. The classification server can then determine a response value for each decision tree within the classification model and identify feature contribution values that are associated with the response values (e.g., associated with the terminal nodes that are associated with that response value). This step can be performed during an online phase.

At step 509 of the method, the classification server classify the new entity based on the response values. For example, the classification server can determine one or more classifiers based on the aggregated response scores using a sigmoidal function and one or more threshold values. This step can be performed during an online phase.

At step 510 of the method, the classification server can identify a reason code for each of the classifiers. The reason code may be a label indicating the features of the entity that were the greatest cause for the classification of the entity. The reason codes can be sent to the requesting computer in some cases. This step can be performed during an online phase.

VI. Example Computer Systems

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art, such as a serial port. For example, a serial port or an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

As described, the embodiments may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present systems and methods using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

All patents, patent applications, publications, and descriptions mentioned herein are incorporated by reference in their entirety for all purposes. None is admitted to be prior art.

What is claimed is:

1. A method for identifying reason codes, the method comprising:

obtaining training data for a plurality of entities, each entity of the plurality of entities characterized by a plurality of features, the training data including a feature value for each feature of the plurality of features for each entity of the plurality of entities;

obtaining classification data for the plurality of entities, the classification data associating a plurality of classifiers with the plurality of entities, each entity of the plurality of entities associated with one or more classifiers of the plurality of classifiers;

building a classification model using the training data and the classification data, the classification model including a plurality of decision trees for selecting the one or more classifiers;

determining a plurality of expected values including an expected value for each feature of the plurality of features, the expected value for a particular feature based on feature values of that feature for each entity of the plurality of entities;

determining a plurality of feature-contribution values based on the classification model and the plurality of expected values;

associating the plurality of feature-contribution values with the classification model;

receiving, from a requesting computer, new entity data for a new entity, the new entity data including a new plurality of feature values for each feature of the plurality of features;

traversing the classification model using the new plurality of feature values, the traversal of the classification model used to select one or more new classifiers of the new entity and one or more contributing-features;

subsequent to selecting the one or more new classifiers and the one or more contributing-features, identifying a reason code for each of the one or more contributing-features; and sending, to the requesting computer, the one or more classifiers and the one or more reason codes.

2. The method of claim 1, wherein each decision tree of the plurality of decision trees contain a plurality of branches, each branch containing one or more conditional nodes and a terminal node, each of the one or more conditional nodes associated with a particular feature and a set of feature values for the particular feature, each of the terminal nodes associated with a response value, wherein the selecting of the one or more classifiers is based on the response values.

3. The method of claim 1, wherein the determining of a feature-contribution value for a particular feature is based on a difference between a first response value of a first terminal node included in a first branch having a first condition based on the particular feature and a second response value of a second terminal node included in a second branch having a second condition based on the particular feature.

4. The method of claim 1, wherein the determining of the expected value for each feature of the plurality of features is based on the feature values of that feature for each entity of the plurality of entities.

5. The method of claim 1, wherein the determining of the expected value for each feature of the plurality of features is based on an average of the feature value of that feature across each entity of the plurality of entities.

6. The method of claim 1, wherein the determining of the plurality of feature-contribution values includes determining one or more feature-contribution values for each feature of the plurality of features.

7. The method of claim 6, wherein the determining of the plurality of feature-contribution values includes determining one or more feature-contribution values for each terminal node of each decision tree of the plurality of decision trees based on a response value associated with that particular terminal node and the expected values for each feature associated with conditional nodes of a branch within which the particular terminal node is included, the one or more feature-contribution values for the particular terminal node including a feature-contribution value for each feature associated with the conditional nodes of the branch within which the particular terminal node is included.

8. The method of claim 1, wherein the feature-contribution value for a particular feature indicates an amount the particular feature contributed to a corresponding response value.

9. The method of claim 1, further comprising selecting a first plurality of terminal nodes from the plurality of decision trees based on the traversal of the classification model using the new plurality of feature values for the new entity.

10. The method of claim 9, further comprising:
identifying a first response value and one or more first feature-contribution values associated with the each terminal node of the selected first plurality of terminal nodes;
selecting one or more classifiers for the new entity based on the first response value; and
selecting one or more contributing-features for the new entity based on the one or more first feature-contribution values.

11. The method of claim 1, wherein determining a feature-contribution value for the particular feature is based on a difference between a response value of a first terminal node and a summation of adjusted response values of terminal nodes within a branch selected by the expected value for the particular feature.

12. A computer system, comprising
one or more processor circuits; and
a non-transitory computer-readable storage medium coupled to the one or more processor circuits, the storage medium storing code executable by the one or more processor circuits for performing a method comprising:
obtaining training data for a plurality of entities, each entity of the plurality of entities characterized by a plurality of features, the training data including a feature value for each feature of the plurality of features for each entity of the plurality of entities;
obtaining classification data for the plurality of entities, the classification data associating a plurality of classifiers with the plurality of entities, each entity of the plurality of entities associated with one or more classifiers of the plurality of classifiers;
building a classification model using the training data and the classification data, the classification model including a plurality of decision trees for selecting the one or more classifiers;
determining a plurality of expected values including an expected value for each feature of the plurality of features, the expected value for a particular feature based on feature values of that feature for each entity of the plurality of entities;
determining a plurality of feature-contribution values based on the classification model and the plurality of expected values;
associating the plurality of feature-contribution values with the classification model;
receiving, from a requesting computer, new entity data for a new entity, the new entity data including a new plurality of feature values for each feature of the plurality of features;
traversing the classification model using the new plurality of feature values, the traversal of the classification model used to select one or more new classifiers of the new entity and one or more contributing-features;
subsequent to selecting the one or more new classifiers and the one or more contributing-features, identifying a reason code for each of the one or more contributing-features; and
sending, to the requesting computer, the one or more classifiers and the one or more reason codes.

13. The system of claim 12, wherein each decision tree of the plurality of decision trees contain a plurality of branches, each branch containing one or more conditional nodes and a terminal node, each of the one or more conditional nodes associated with a particular feature and a set of feature values for the particular feature, each of the terminal nodes associated with a response value, wherein the selecting of the one or more classifiers is based on the response values.

14. The system of claim 12, wherein the determining of a feature-contribution value for a particular feature is based on a difference between a first response value of a first terminal node included in a first branch having a first condition based on the particular feature and a second response value of a second terminal node included in a second branch having a second condition based on the particular feature.

15. The system of claim 12, wherein the determining of the expected value for each feature of the plurality of features is based on the feature values of that feature for each entity of the plurality of entities.

16. The system of claim 12, wherein the determining of the expected value for each feature of the plurality of features is based on an average of the feature value of that feature across each entity of the plurality of entities.

17. The system of claim 12, wherein the determining of the plurality of feature-contribution values includes determining one or more feature-contribution values for each feature of the plurality of features.

18. The system of claim 12, wherein the feature-contribution value for a particular feature indicates an amount the particular feature contributed to a corresponding response value.

19. The system of claim 12, wherein the method further comprises selecting a first plurality of terminal nodes from the plurality of decision trees based on the traversal of the classification model using the new plurality of feature values for the new entity.

20. The system of claim 19, wherein the method further comprises:
- identifying a first response value and one or more first feature-contribution values associated with the each terminal node of the selected first plurality of terminal nodes;
- selecting one or more classifiers for the new entity based on the first response value; and
- selecting one or more contributing-features for the new entity based on the one or more first feature-contribution values.

* * * * *